United States Patent
Blackwell

(10) Patent No.: US 9,763,376 B2
(45) Date of Patent: Sep. 19, 2017

(54) FORWARD ROTATING TRANSPORT AXLE

(71) Applicant: Kinze Manufacturing, Inc., Williamsburg, IA (US)

(72) Inventor: Robert Blackwell, Coralville, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 208 days.

(21) Appl. No.: 13/803,186

(22) Filed: Mar. 14, 2013

(65) Prior Publication Data

US 2014/0096983 A1    Apr. 10, 2014

Related U.S. Application Data

(60) Provisional application No. 61/667,486, filed on Jul. 3, 2012.

(51) Int. Cl.
*A01B 63/22* (2006.01)
*A01B 73/06* (2006.01)
*A01C 7/08* (2006.01)

(52) U.S. Cl.
CPC ............ *A01B 63/22* (2013.01); *A01B 73/065* (2013.01); *A01C 7/08* (2013.01)

(58) Field of Classification Search
CPC ....................................................... A01B 63/22
USPC .................................................. 172/407, 423
See application file for complete search history.

(56) References Cited

U.S. PATENT DOCUMENTS

| | | | | |
|---|---|---|---|---|
| 2,181,410 A | * | 11/1939 | Strandlund | ................. 280/43.17 |
| 2,351,830 A | * | 6/1944 | Mitchell et al. | ........... 172/799.5 |
| 2,635,888 A | * | 4/1953 | Bailiff | ........................... 172/246 |
| 2,970,658 A | * | 2/1961 | Kopaska | ........................ 172/456 |
| 2,994,544 A | * | 8/1961 | Wolf | ........................... 280/43.23 |
| 3,643,745 A | * | 2/1972 | Betulius et al. | .............. 172/413 |
| 3,679,224 A | * | 7/1972 | Hatcher | ...................... 280/43.23 |
| 4,043,403 A | * | 8/1977 | Anderson et al. | ...... A01B 63/22 |
| | | | | 172/413 |
| 4,119,329 A | * | 10/1978 | Smith | .................... A01B 51/04 |
| | | | | 172/240 |
| 4,171,022 A | * | 10/1979 | Applequist | .................... 172/311 |
| 4,364,581 A | * | 12/1982 | Shoup | ............................ 172/311 |
| 4,504,076 A | * | 3/1985 | Bedney | ......................... 172/311 |
| 4,582,143 A | * | 4/1986 | Pratt | ..................... A01B 73/005 |
| | | | | 172/311 |

(Continued)

*Primary Examiner* — Thomas B Will
*Assistant Examiner* — Joel F. Mitchell
(74) *Attorney, Agent, or Firm* — McKee, Voorhees & Sease, PLC

(57) ABSTRACT

A forward folding implement is provided. The implement includes a telescoping tongue to allow forward folding wings of the implement. At one end of the tongue are positioned transport wheels that are used to level the height of the frame during planting to keep the row units at determined heights of the single plant uniform depth, while also providing a support for the implement during transport of the implement. A transport wheel rotating assembly is provided to rotate the transport wheels about a pivot point such that the transport wheels will adjust the height of the implement, and also increase or decrease the length of the wheelbase between the tractor tires and the transport tires to increase the maneuverability and transportability of the implement both within a field and outside a field. The assembly includes a linkage and a cylinder connected to the implement.

18 Claims, 7 Drawing Sheets

(56) References Cited

U.S. PATENT DOCUMENTS

| | | | | |
|---|---|---|---|---|
| 4,596,290 | A | * | 6/1986 | Bedney ................ A01B 73/065 172/311 |
| 4,660,842 | A | * | 4/1987 | Watt et al. ................. 280/43.23 |
| 4,871,030 | A | * | 10/1989 | Kruse ........................... 172/397 |
| 5,113,956 | A | * | 5/1992 | Friesen et al. ....... A01B 73/065 172/311 |
| 6,408,950 | B1 | * | 6/2002 | Shoup ........................... 172/311 |
| 7,063,167 | B1 | * | 6/2006 | Staszak et al. ...... A01B 73/044 172/311 |
| 7,921,932 | B2 | * | 4/2011 | Poole .................... A01C 7/208 172/311 |
| 8,235,133 | B2 | * | 8/2012 | Friggstad ............ A01B 73/065 16/35 R |
| 2010/0126744 | A1 | | 5/2010 | Poole |

* cited by examiner

FORWARD ROTATING TRANSPORT AXLE

CROSS-REFERENCE TO RELATED APPLICATIONS

This application claims priority under 35 U.S.C. §119 to provisional application Ser. No. 61/667,486, filed Jul. 3, 2012, which is hereby incorporated in its entirety.

FIELD OF THE INVENTION

The present invention relates generally to the field of agricultural equipment. More particularly, but not exclusively, the invention relates to a forward folding implement, such as a forward folding planter.

BACKGROUND OF THE INVENTION

As the power of tractors and agricultural efficiency has increased, agricultural implements such as planters have increased in span, or width, to accommodate larger numbers of individual row units. Large planters generally include a main frame having a forward hitch assembly for drawing by a tractor and left and right wing sections pivotally attached to a portion of the main frame. The pivoting wing connections allow the wings to fold relative to the main frame for transport and storage of the planter. Early planters pivotally displaced the wings vertically to reduce planter width and provide clearance for transport through narrow spaces.

However, as the size of planters has increased, planter wings are generally folded in a forward direction to accommodate longer planter wings. This evolution has necessitated the incorporation of telescoping hitch assemblies and specific folding functions to accommodate planter wings of increased length. The telescoping hitch assemblies allow components of the hitch to be inserted within each other to vary the length between the hitch and the main frame. Therefore, the longer the wing sections, the longer the tongue will have to telescope to accommodate folding of the wings. This causes the transport wheels of the main frame to be extended away from the tractor.

As the planters are getting larger and heavier, it is becoming more difficult to be able to transport these machines to and from the field. Forward folding planters are prone to extreme hitch weight on the tractor and a large turning radius due to the long wheelbase between the tractor tires or tracks and the planter transport tires. This long wheelbase is because the transport tires of the planter are also used to set the height of the frame during planting to keep the row units at a height so the machine will plant at a uniform depth. The ideal location for the tires to level the frame height is between the row units. This location of the tires also provides that the planter does not account for negative hitch weight on the tractor when the planter is unfolded and the row units are off the ground.

Methods exist to shorten the wheelbase between the tractor tires and the planter transport tires. For instance, some planters include a sliding transport axle at the main frame of the planter. The axle is able to slide along the tongue to move toward and away from the rear of the tractor to alter the wheelbase. However, it can be very difficult to cause the axle to slide, especially when seed, fertilizer, insecticide, or other material weighs down the planter. The sliding action can cause increase wear and stress to the main frame of the implement, while also adding complexity to the machine. Furthermore, as the components of planters are commonly made from metals, there exists a chance that rusting or deformation could occur, which could prevent the axle from being able to slide along the tongue.

U.S. Pat. No. 6,408,950 to Shoup (the '950 patent) discloses a planter having an independent support wheel assembly that is slideable towards the a new center of gravity after the frame has moved from an extended or working position to a folded or transport position. However, the '950 patent includes the use of two separate motor mechanisms and wheel systems. Each of the motor mechanisms includes separate cylinders to raise and lower separate wheels. Therefore, one wheel may be lowered while the other is raised. However, the wheels must be raised and lowered individually. The separate motor mechanisms, wheels, and cylinders will also take up much space and will add a great deal of weight to the planter. The addition of multiple moving assemblies and parts also increases the chances that a moving component can fail or become damaged, which will affect the use of the planter. The multiple moving parts also increase the cost and complexity of the machine and the operation thereof.

Therefore, there is a need in the art of agricultural equipment for a method and apparatus for adjusting the wheelbase length between tractor wheel and implement transport wheel and accommodating a shift of the center of gravity of the implement that is simple to operate. There is also a need in the art for a method and apparatus for adjusting the wheelbase length and accommodating a shift of the center of gravity that will not increase the weight and cost of the implement, while also being effective.

SUMMARY OF THE INVENTION

It is therefore a primary object, feature, and/or advantage of the present invention to overcome deficiencies in the art.

It is another object, feature, and/or advantage of the present invention to provide an implement with an adjustable wheelbase length.

It is yet another object, feature, and/or advantage of the present invention to provide an implement with a transport wheel assembly capable of accommodating a shift of the center of gravity from movement of the wings between an extended, working position and a folded, transport position.

It is still yet another object, feature, and/or advantage of the present invention to provide a forward folding implement with a rotatable transport axle.

It is a further object, feature, and/or advantage of the present invention to provide an agricultural implement that includes a transport axle capable of rotating approximately 150°.

It is still a further object, feature, and/or advantage of the present invention to provide an agricultural implement including a wheel arm extending from a transport axle that will change the wheelbase length by 1.5 times the wheel arm length.

It is yet a further object, feature, and/or advantage of the present invention to provide an agricultural implement including a rotatable transport axle that is operated by a single cylinder and linkage.

It is another object, feature, and/or advantage of the present invention to provide an agricultural implement having a transport axle movable between a planting position, turning position, and a transport position.

These and/or other objects, features, and advantages of the present invention will be apparent to those skilled in the art. The present invention is not to be limited to or by these objects, features and advantages. No single embodiment need provide each and every object, feature, or advantage.

The invention includes a forward folding implement attached to a tractor. The implement includes a hitch, a telescoping tongue, a main frame including an axle, and wheels extending from the main frame and axle. The implement also includes wings and a plurality of row units at the main frame and wings. Because the ideal location of the transport wheels is between the row units during planting, the wheelbase length of the planter is extended. To reduce the wheelbase between the planter and tractor, the planter support wheels need to move forward towards the hitch during transport. To accomplish this shorter wheelbase, the axle that connects the transport tires will rotate close to 150 degrees underneath the planter. The rotation can decrease the tractor/planter wheelbase by 1.5 times the wheel arm length.

According to an exemplary embodiment of the present invention, a forward folding implement having a field use configuration and a transport configuration is provided. The implement includes a telescoping tongue having a first end including a hitch and an opposite second end. A main frame is positioned at the second end of the tongue and includes a main axle and a plurality of transport wheels extending from the main axle. First and second wings extend from the main frame and include a plurality of wing wheels extending therefrom. A transport wheel rotating assembly is positioned at the main frame and comprises a linkage attaching the transport wheels to the main frame and a cylinder operatively attached to the linkage. The transport wheel rotating assembly is configured to move the transport wheels between a retracted position for the field use of the implement wherein the transport wheels are positioned rearward of the main frame, and a transport position wherein the transport wheels are positioned frontward of the main frame.

Figure 1:
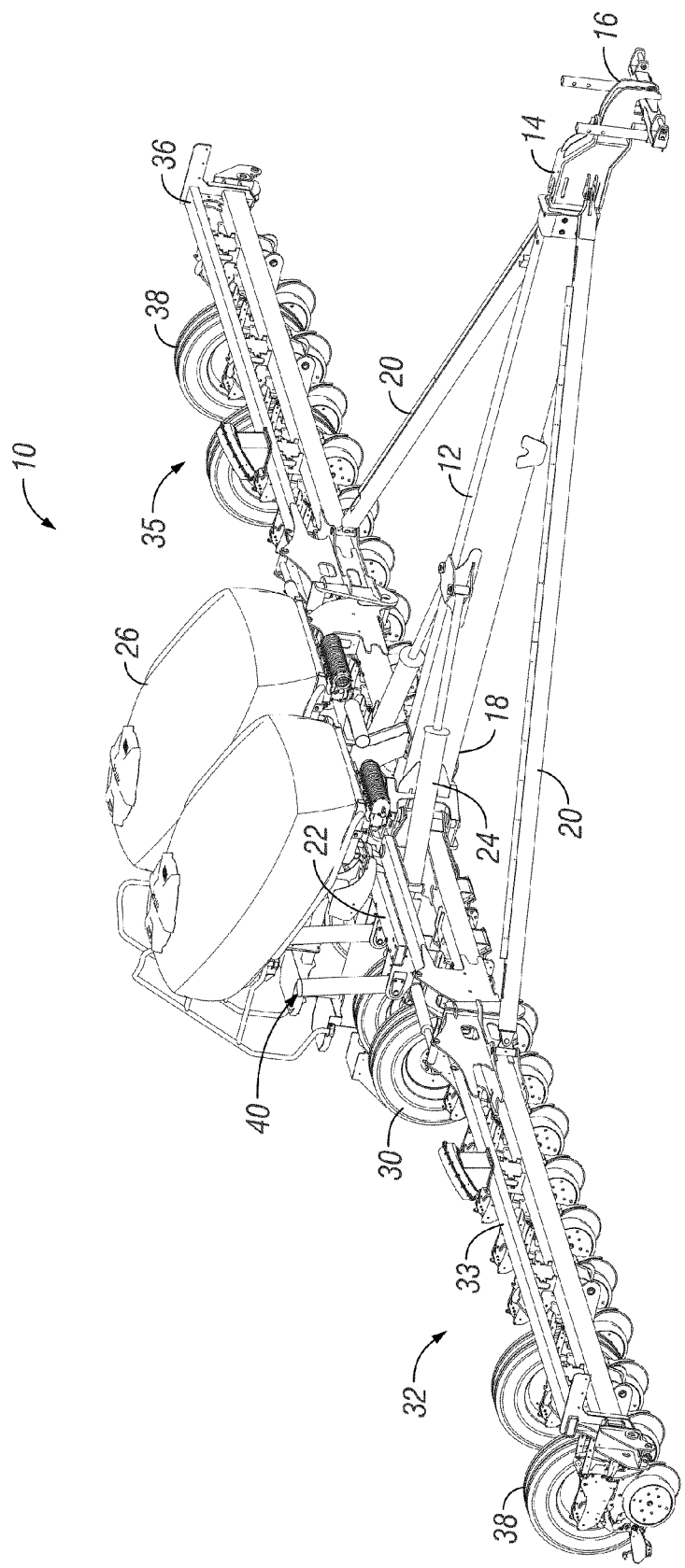
FIG. 1 is a perspective view of a forward folding implement according to the present invention with the implement in a planting position.

Before any independent features and embodiments of the invention are explained in detail, it is to be understood that the invention is not limited in its application to the details of the construction and the arrangement of the components set forth in the following description or illustrated in the drawings. The invention is capable of other embodiments and of being practiced or of being carried out in various ways. In addition, it is understood that the phraseology and terminology used herein is for the purpose of description and should not be regarded as limiting.

DETAILED DESCRIPTION OF THE PREFERRED EMBODIMENTS

FIG. 1 is a perspective view of a forward folding implement 10 according to the present invention with the implement 10 in a planting position. While the present invention shows the implement 10 to be a planter, it should be appreciated by those skilled in the art that the invention covers other types of implements, including but not limited to, nutrient applicators, plows, disks, and other agricultural equipment. However, for exemplary purposes, the invention will be described for a forward folding-type implement 10, such as a forward folding planter.

FIG. 1 shows a forward folding planter 10 with a tongue 12. The tongue 12 includes a first end 14 and an opposite second end 18. At the first end 14 of the tongue 12 is a hitch 16. The hitch 16 allows the implement 10 to be attached to a tractor (not shown) or other vehicle for pulling the implement 10. The hitch 16 may be any hitch used in the industry. The tongue 12 may be a telescoping tongue such that the tongue 12 includes multiple sections that can be inserted and moved relative to one another such that the length of the tongue 12 can be varied. The telescoping of the tongue 12 may be further aided by the addition of tongue supports 20 on opposite sides of the tongue 12. As will be discussed, the tongue supports 20 connect the first end 14 of the tongue 12 to first and second wings 32, 35 such that when the wings fold by operation of cylinders 24, the supports 20 will extend one section of the telescoping tongue 12 to lengthen the tongue 12 so that the wings 32, 35 are able to be folded adjacent one another.

Positioned at or near the second end 18 of the tongue 12 is a main or central frame 22. The main or central frame 22 extends generally perpendicular to the tongue 12. The central frame also includes housing for main hoppers 26. The main hoppers 26 house material, such as seed, insecticide, fertilizer, or the like, which is distributed through a system to individual row units. Therefore, a great deal of weight is located at the central frame 22. The central frame includes central row units (not shown) extending from the rear of the central frame to distribute the material to a field. The central frame also includes a main axle 28 and transport wheels 30 extending from the main axle 28 and the main frame 22. The transport wheels 30 support the main or central frame 22, and also are the wheels that contact the ground when the implement 10 is transported to or from a field.

Extending from opposite sides of the central frame 22 are first and second wings 32, 35. The first and second wings 32, 35 generally mirror one another, and therefore, only one wing will be described. It should be appreciated that the opposite wing will include generally the same components. The first wing 32 includes a first frame 33 extending separate from, but extending generally in the same plane as the main frame 22. A plurality of row units (not shown) will be connected to the first frame 33. The row units of the first wing 32 are generally the same as row units of the central frame 22 and that of the opposite wing 35. The number of row units used with an implement 10 may vary depending on the size of the implement 10, the requirements of the field, the type of material being distributed to the field, and the like. Also extending from the wing frame 33 are wing wheels 38. The wing wheels 38 support the outer ends of the wings 32, 35 and allow the implement 10 to be moved without the row units penetrating the ground when turning in the field, crossing waterways or the like.

Figure 2:
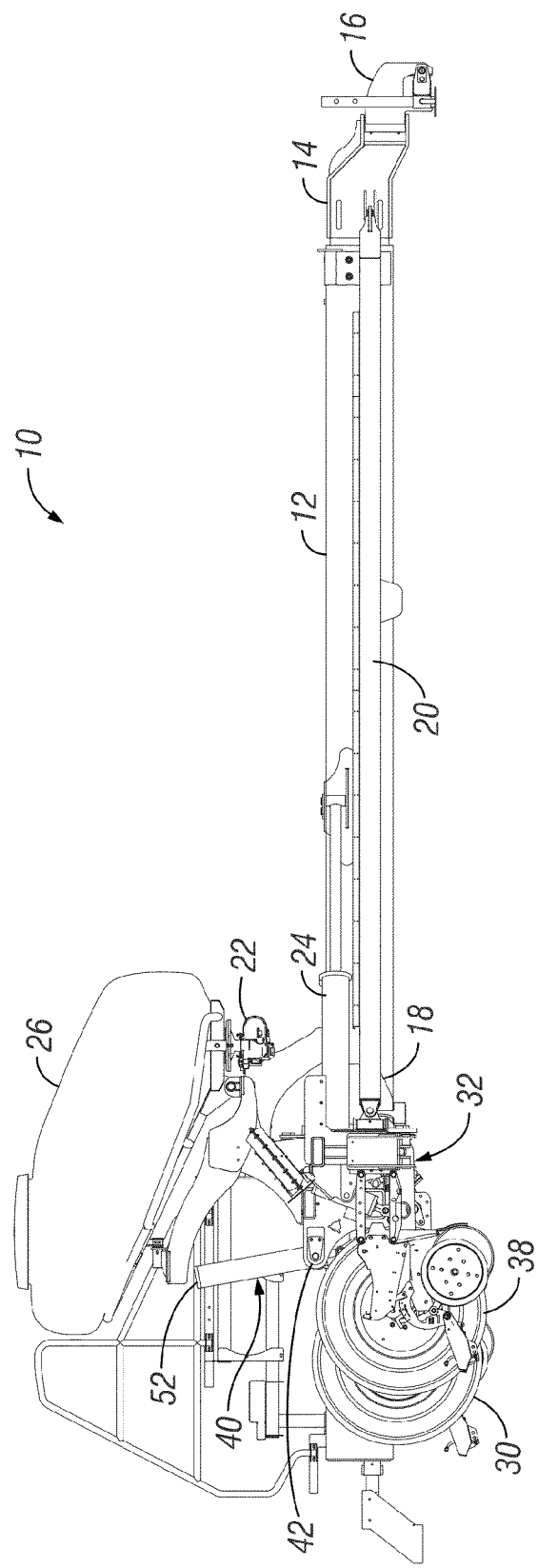
FIG. 2 is a side elevation view of the implement of FIG. 1 with the main or transport wheels in a planting position.

FIGS. 1 and 2 further show the implement 10 of the present invention in a planting position. When the implement 10 is in the planting position, the wheels, including the transport wheels 30 and the wing wheels 38, are retracted to a position where they are generally rearward of the main frame 22 and the wing frames 33, 36. The positioning of the wheels is such that the wheels will be raised to allow the row units to sufficiently contact and penetrate the ground of the field. However, it should be appreciated that the wheels will need to be able to move from the planting position to other positions in order to move the implement 10 both within the field and outside of the field.

Figure 3:
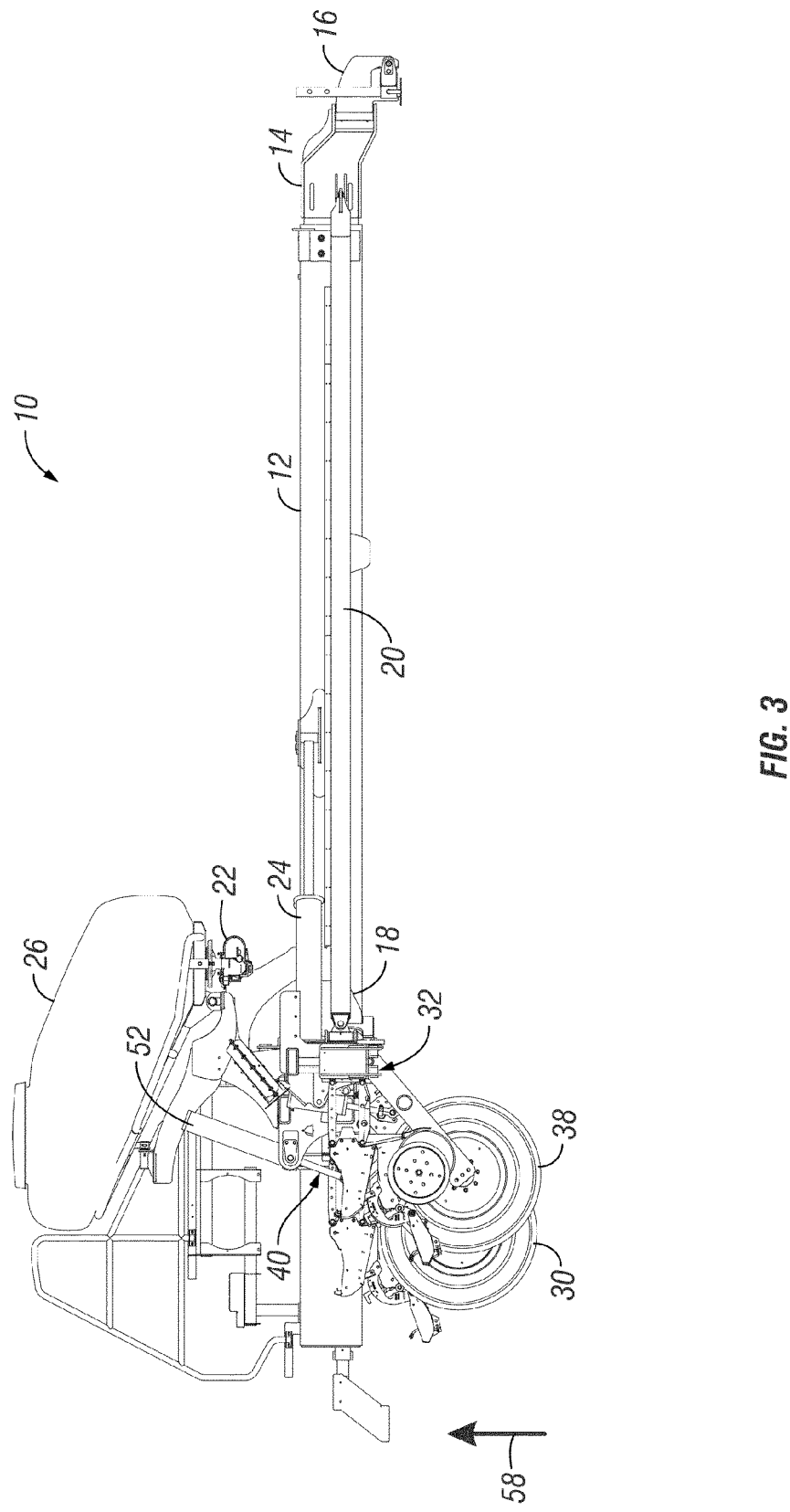
FIG. 3 is a side elevation view of the implement of FIG. 1 with the main or transport wheels in a field turn position.

As shown in FIG. 3, the wheels 30, 38 of the implement 10 have been adjusted such that the implement 10 is in a field turn position. The wing wheels 38 include cylinders or other moving mechanisms to move the wheels between the planting position and the field turn position, as shown in FIGS. 2 and 3. Furthermore, the transport wheels 30 include a transport wheel rotating assembly 40 that allows the transport wheels 30 to be rotated relative to the main frame 22 about the main axle 28 and including more rotational movement than that of the wing wheels 38. The transport wheel rotating assembly 40 includes a cylinder 52 connecting between the main frame 22 and the linkage 42. The configuration and use of the linkage 42 will be discussed more below. The cylinder 52 is extended from the position of FIG. 2 to that of the position in FIG. 3 such that the transport wheels 30 are rotated in a counterclockwise direction such that the wheels contact the ground and then begin to lift the row units away from the ground as shown by the arrow generally depicted as numeral 58. Furthermore, the cylinder 52 and linkage 42 of the transport wheel rotating assembly 40 is sized such that the rotation of the wheels will lift the implement 10 off the ground such that the row units will no longer be in contact with the ground.

Furthermore, the number of cylinders 52 and rotating assemblies 40 may vary. The present invention contemplates that only one cylinder and linkage is required to rotate the transport wheels 30. However, as shown in the figures, the invention also contemplates that more rotating assemblies 40 may be included, including a rotating assembly 40 for each of the transport wheels 30. For example, when the implement 10 includes four transport wheels 30, four rotating assemblies 40 can be included and connected between the frame and the wheels to rotate the wheels between field use, turning, and transport configurations. Therefore, it should be appreciated that generally any number of rotating assemblies, including cylinders and linkages, may be used and all variations of the like are to be considered part of the invention.

In the position shown in FIG. 3, the tractor is more easily able to turn within a field, as the row units do not provide drag and are not subjected to destructive side loads that would restrict turning. It should be appreciated by those skilled in the art that while FIG. 3 shows the transport and wing wheels at an angle relative to the frames and implement 10, the purpose of putting the implement 10 in a field turn position is to raise the row unit from the ground, and therefore, any position of the wheels such that the row units are positioned away from the field is acceptable for a field turn position.

Figure 4:
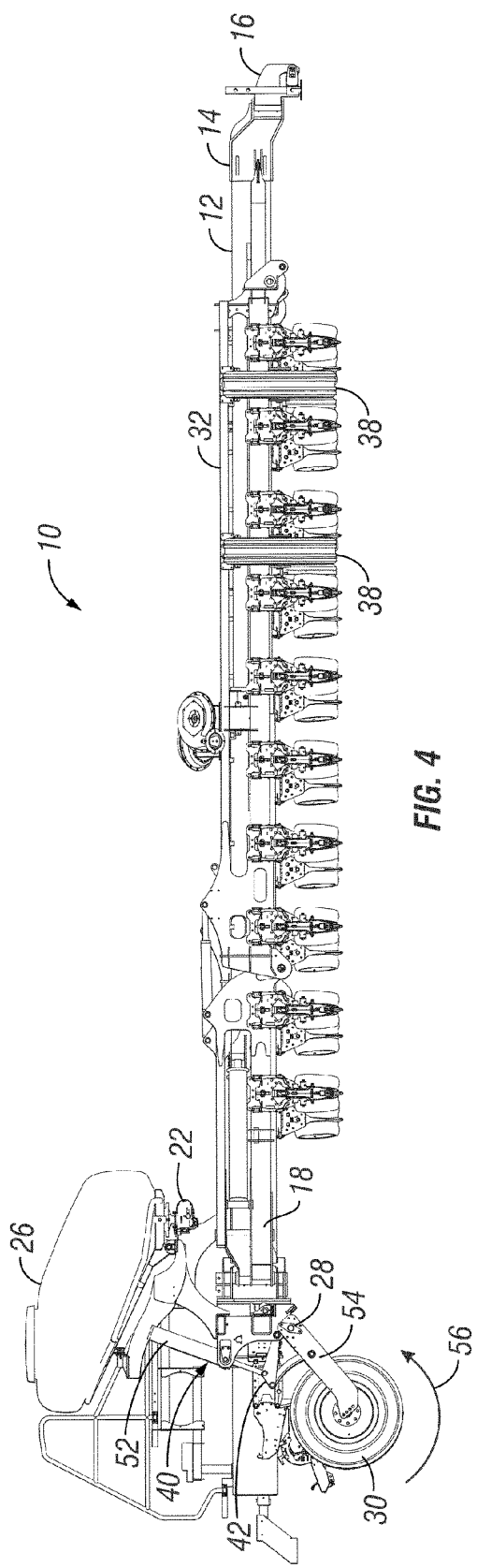
FIG. 4 is a side elevation view of the implement of FIG. 1 with the transport wheels in a transport position without axle rotation.
Figure 5:
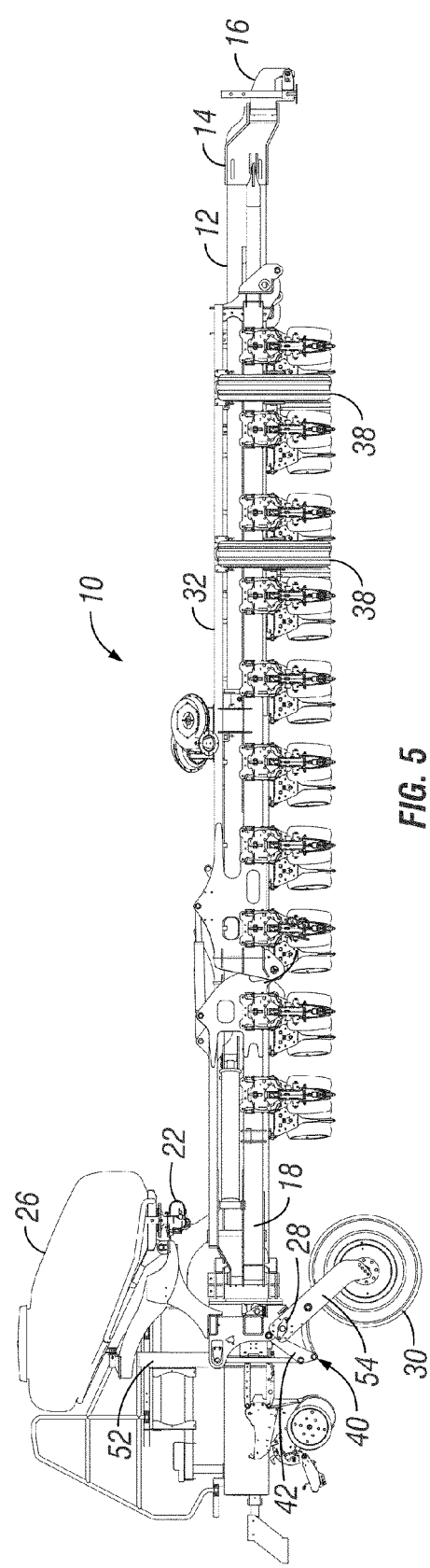
FIG. 5 is a view similar to FIG. 4, but with axle rotation of the transport wheels.
Figure 6:
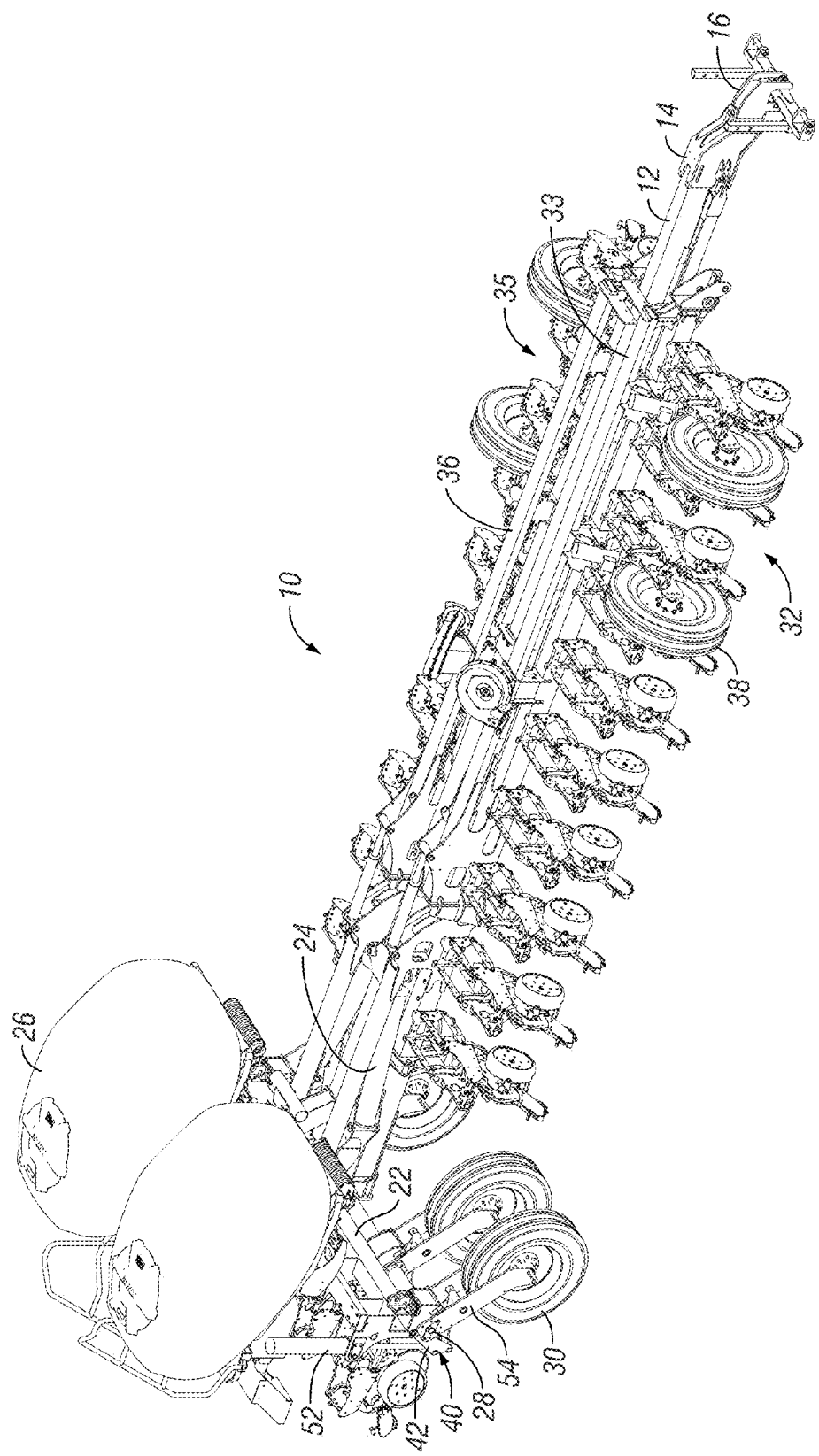
FIG. 6 is a perspective view of the implement of FIG. 1 with the wings and transport wheels in a transport position and with axle rotation.

FIGS. 4-6 show the implement 10 in a transport position with and without rotation of the transport wheels 30 about the main axle 28 by the transport wheel rotating assembly 40. In these figures, the wings 32, 35 have been folded in a forward movement, i.e., rotated about a generally vertical axis. The wings 32, 35 are folded by forward folding cylinders 24 connected between the wings 32, 35 and the tongue 12 to move the wings 32, 35 with the first wing 32 and the second wing 35 on opposite sides of the tongue 12 and generally adjacent to one another. At this position, the wings 32, 35 may be locked in place such that they will be held in this position. The forward folding of the wings 32, 35 may be accomplished once the implement 10 is in a field turn position, e.g., the configuration shown in FIG. 3. As shown in FIG. 4, the raising of the row units off the ground allows the wings 32, 35 to be folded easier and without drag or other restrictions. However, when the implement 10 is in such a transport position such that the transport wheel 30 is still in a field turn position, the wheelbase or length from the hitch 16 to the transport wheels 30 is rather large. In addition, the length is even larger from the position of the tractor wheel to the position of the transport wheels 30. Thus, the large wheelbase will make it more difficult for an operator to control the movement of the implement 10, including turns. The larger a wheelbase, the wider a turn must be, which can decrease the safety of the turns outside of a field for both the operator and other traffic.

As shown in FIGS. 5 and 6, the present invention contemplates the use of a transport wheel rotating assembly 40 to rotate the position of the transport wheel 30 about the direction of the arrow 56. The transport wheel rotating assembly 40 includes a linkage 42 attached to the main axle 28, and a rotating cylinder 52 connected to the linkage 42. One of the bars of the linkage 42 is a wheel arm 54 extending from the main axle 28 to the axle of the transport wheel 30. Therefore, the transport wheel 30 rotates along with the wheel arm 54. As shown, the transport wheel rotating assembly 40 may rotate the transport wheel 30 up to approximately 150° from the position of the transport wheel 30 in the planting position. The configuration of the linkage 42 and the length of the rotating cylinder 52 are such that the wheel base length may be shortened by a distance approximately 1.5 times the length of the wheel arm 54. This reduction in length of wheelbase increases the maneuverability of the implement 10, reduces the turning radius of the implement 10, and creates a generally safer transport. By allowing the wheelbase length to be shortened with the transport wheel rotating assembly 40, the present invention also accommodates for the wings 32, 35 being greater in length as the length of the wheelbase 10 may be shortened to compensate the forward shift of the center of gravity once the wings are in a folded position. Put another way, having longer wings 32, 35 would normally increase the wheelbase. The assembly 40 of the present invention would compensate for the longer wing length by reducing the otherwise added length by rotating the wheels.

Advantages of the present invention are numerous. As stated, the rotational movement of the transport wheel 30 from that shown in FIG. 1 to that shown in FIG. 4 reduces the wheelbase length, which is the length of the distance between the transport wheel 30 and the hitch 16 or the wheels of the tractor (not shown). This reduction of wheel base length increases the maneuverability of the implement during transport of the implement 10. The use of the transport wheel rotating assembly 40 also accommodates a longer set of wings 32, 35, which allows for the use of more row units on the wings 32, 35. The use of more row units on the wings 32, 35 allows for more rows to be planted at one time, such that a farmer or operator is able to reduce the amount of time in the field during planting. In addition, as the wheelbase length may be considered to be shortened or lengthened by approximately 1.5 times the length of the wheel arm 54 by adjusting the length of said wheel arm 54, the wheelbase length may be configured to be appropriate for different types of implements 10.

Figure 7:
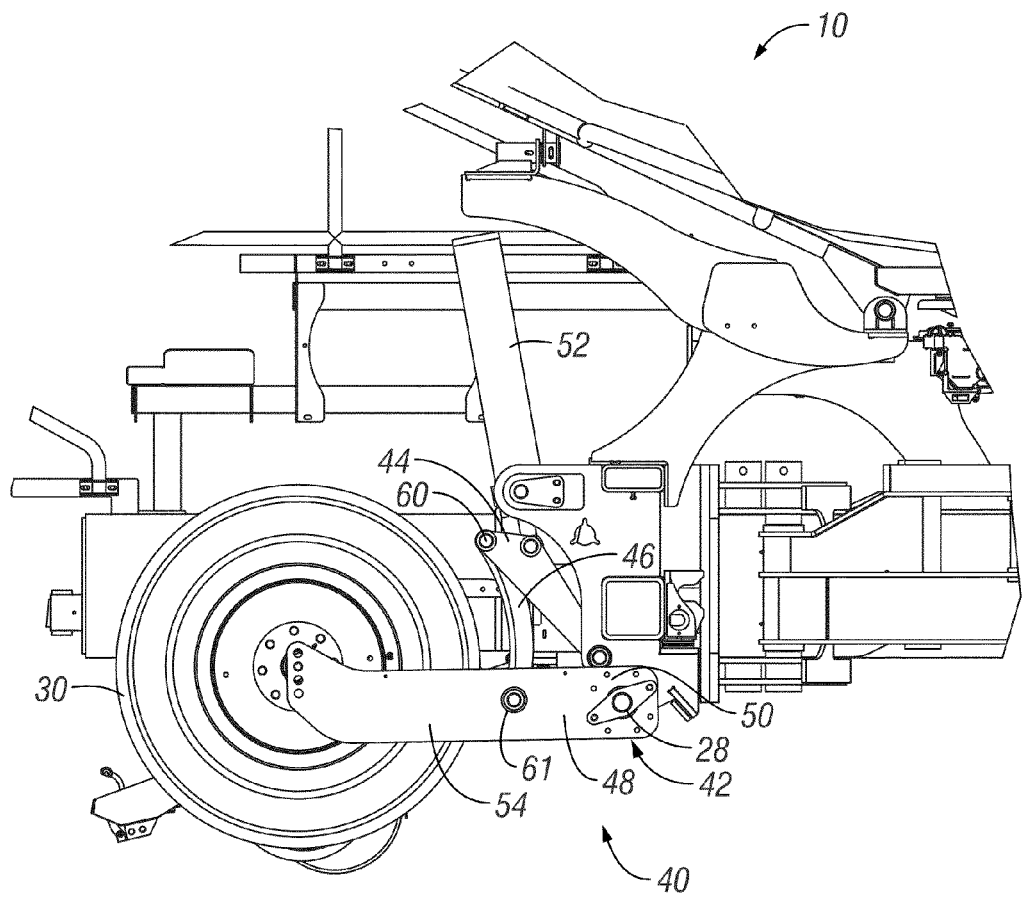
FIG. 7 is an enlarged side view of the transport wheel rotating assembly of the implement of the present invention being in a planting position.
Figure 8:
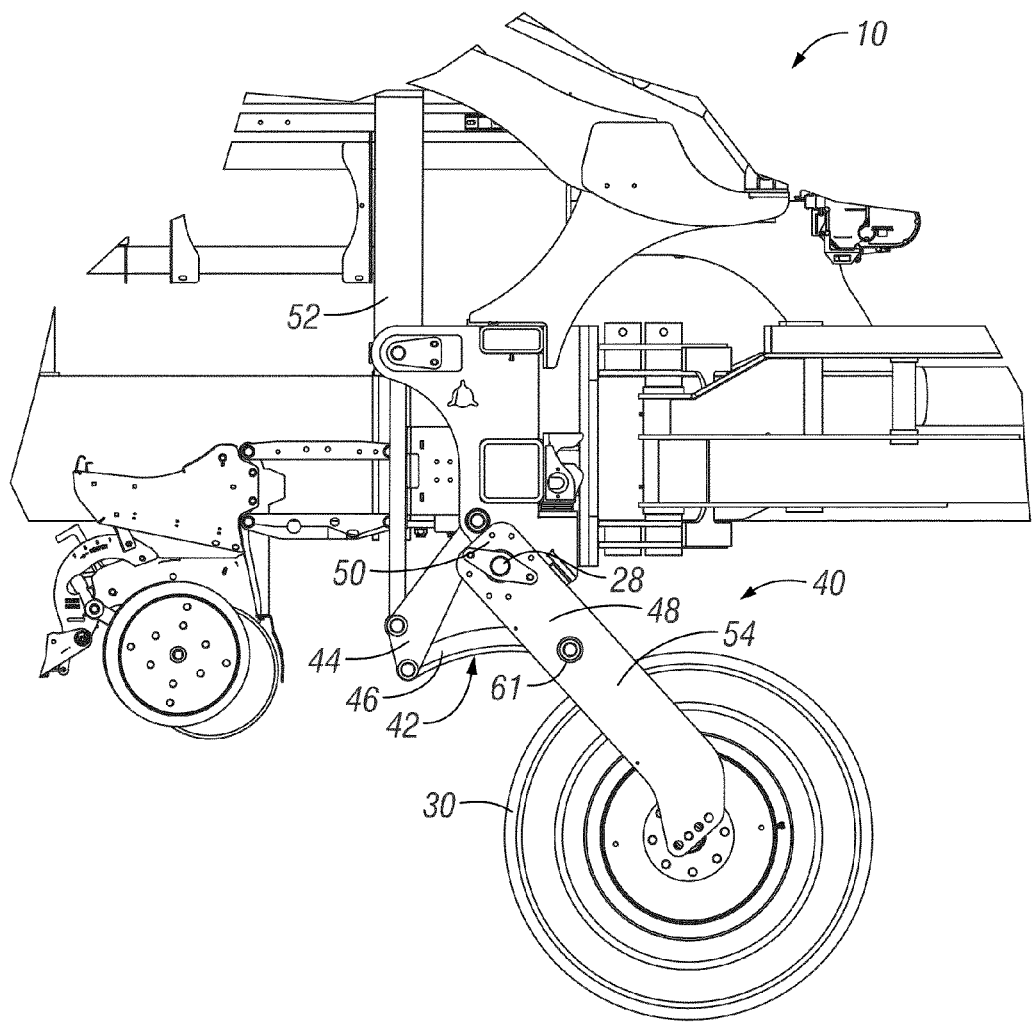
FIG. 8 is an enlarged side view of the transport wheel rotating assembly of the implement of the present invention being in a transport position.

FIGS. 7 and 8 are enlarged views of the transport wheel rotating assembly 40 of the present invention. As discussed, the transport wheel rotating assembly 40 includes a linkage 42 connected to the main axle 28 and a rotating cylinder 52 connected to the linkage 42. The linkage 42 is a four bar linkage and includes a first bar 44, second bar 46, third bar 48, and fixed link 50. The fixed link 50 or frame may not be a discrete structural member, but rather can comprise a commonly understood component of the typical four bar linkage that extends between two cranks, in this case the first bar 44 and the third bar 48, opposite the connecting rod. The bars of the linkage 42 are connected by pins 60 or other connecting devices, which allow the bars to rotate relative to one another. Therefore, each end of the bars 44, 46, 48 includes apertures therethrough such that the apertures of the bars will line up with one another to create the our bar linkage 42. The construction of the linkage 42 and the lengths of each of the bars is such to allow for the rotation of the transport wheel 30 upon extension or retraction of the cylinder 52. The extension of the cylinder 52 creates a rotational movement about the pivot or main axle 28 to move the transport wheel 30 from the planting position to a transport position, as well as positions therebetween. The amount of rotation can be varied by changing the lengths of the individual bars of the linkage 42, as well as the size and length of the cylinder 52. Furthermore, it should be appreciated that the cylinder 52 is sized such that it is able to rotate the transport wheels 30 with enough force to be able to lift the implement 10, as was previously discussed. Furthermore, while it is preferred that the cylinder 52 be a hydraulic cylinder, other cylinders, such as pneumatic, electric, etc., may be used with the assembly and are contemplated by the present invention as well.

It should be appreciated by one skilled in the art that a transport wheel rotating assembly 40 be positioned at each of the transport wheels 30 at the main or central frame 22. Each of the transport wheel rotating assemblies 40 can work in unison with one another to move or rotate the transport wheel 30 at the same time and rotation of velocity. Thus, each of the linkages 42 and cylinders 52 will be the same for each of the transport wheel rotating assemblies 40. In addition, it is contemplated by the present invention that only one linkage 42 and cylinder 52 be contemplated to be used at the main or central frame 22 with the transport wheels 30 connected by a bar or other mechanism such that the one transport wheel rotating assembly 40 be used to rotate the transport wheels 30 from the planting position and all the way to the transport position. However, it is preferred that each wheel include its own linkage 42 and cylinder 52.

As best shown in FIGS. 7 and 8, the third bar 48 of the linkage 42 may also be the wheel arm 54 connecting the transport wheel 30 to the pivot point or main axle 28. Therefore, the length of the third bar 48 may be varied, with the length being longer than the actual third bar 48 of the linkage 42. Thus, the length of the third bar 48 is considered to be the length between the pins 60, 61 in FIG. 8. However, the length of the wheel arm 54 is longer than the length of the third bar 48 of the linkage 42. This length of the wheel arm 54 may be varied according to the size of the implement 10 and wings 32, 35. As noted above, the length of the wheelbase will be adjusted by rotation of the transport wheel 30 such that the length may be shortened up to 1.5 times the length of the wheel arm 54. Thus, as the length of the wheel arm 54 is adjusted, the length of the wheelbase will be adjusted as well. When an implement 10 includes longer wings 32, 35, a longer wheel arm 54 will be required in order to shorten or decrease the length of the wheelbase to accommodate for the longer wings 32, 35.

A transport wheel rotating assembly for an implement and a method of use has been shown and described. The present invention contemplates numerous variations, options, and alternatives, and is not to be limited to the specific embodiments described here. For example, the length of the bars of the linkage may be varied, the number of transport wheels and rotating assemblies may be varied, and the length of the wings and tongue may be varied as well. Furthermore, while the implement is shown to include central hoppers on the main frame that feed all the individual row units, it is further contemplated that the rotating assembly may be used with an implement including individual hoppers at each of the row units. Furthermore, it should be appreciated that the length and size of the rotating cylinder may be varied according to the amount of weight of the implement. Other changes are considered to be part of the present invention.

What is claimed is:

1. A forward folding implement having a field use configuration and a transport configuration, comprising:
   a telescoping tongue having a first end including a hitch and an opposite second end;
   a main frame at the second end of the tongue and including a main axle and a plurality of transport wheels extending from the main axle;
   first and second wings extending from the main frame and including a plurality of wing wheels extending therefrom; and
   at least one transport wheel rotating assembly positioned at the main axle and comprising a planar four-bar linkage attaching at least one of the transport wheels to the main axle and a cylinder operatively attached to the planar four-bar linkage;
   wherein the at least one transport wheel rotating assembly is configured to rotate the transport wheels about an axis created by the main axle between the field use configuration of the implement wherein the transport wheels are positioned away from the hitch and a rotational axis of the transport wheels being rearward of the main axle, and the transport configuration wherein the transport wheels are positioned toward the hitch and the rotational axis of the transport wheels being in front of the main axle.

2. The implement of claim 1 wherein a bar of the planar four-bar linkage includes a wheel arm extending from the main axle to the at least one transport wheel.

3. The implement of claim 1 wherein the at least one transport wheel rotating assembly is configured to also move the transport wheels to a field turn position, wherein the transport wheels contact the ground generally below the main axle.

4. The implement of claim 1 wherein the at least one transport wheel rotating assembly rotates the transport wheels approximately 150°.

5. The implement of claim 2 wherein another bar of the planar four-bar linkage is pivotally connected to the wheel arm between the main axle and the at least one transport wheel.

6. The implement of claim 5 wherein the rotation of the at least one transport wheel rotating assembly from the field use configuration to the transport configuration decreases a distance between the hitch and the transport wheels by 1.5 times the length of the wheel arm.

7. The implement of claim 1 wherein each transport wheel includes the at least one transport wheel rotating assembly.

8. The implement of claim 1 wherein the plurality of transport wheels comprises four transport wheels operatively connected to the main axle.

9. The implement of claim 8 wherein the at least one transport wheel rotating assembly is operatively connected to each of the four transport wheels and configured to rotate the four transport wheels in unison about the main axle.

10. The implement of claim 1 further comprising first and second cylinders operatively connected between the first and second wings and the tongue and configured to move the wings between a folded configuration and an open configuration.

11. A forward folding implement having first and second wings extending from a main frame extending from a telescoping tongue and having a field use configuration and a field turn configuration with the wings substantially perpendicular to the tongue, and a transport configuration with the wings substantially parallel to the tongue, comprising:
 a plurality of transport wheels operatively connected to the main frame, said main frame including a main axle;
 a transport wheel rotating assembly operatively connected to each of the transport wheels and comprising a planar four-bar linkage attaching the transport wheels to the main axle and a cylinder operatively attached to the planar four-bar linkage;
 a plurality of wing wheels operatively connected to the first and second wings;
 wherein the transport wheels include a rotational axis that is behind the main axle in the field use configuration;
 wherein the transport wheels are in contact with the ground and at least partially behind the main axle in the field turn configuration; and
 wherein the transport wheels are in contact with the ground and the rotational axis of the transport wheels in front of the main axle in the transport configuration.

12. The implement of claim 11 wherein the wing wheels are in contact with the ground and at least partially behind the wings in the field use configuration, and wherein the wing wheels are not in contact with the ground in the transport configuration.

13. The implement of claim 11 wherein the transport wheel rotating assembly rotates the transport wheels approximately 150° about the main axle.

14. The implement of claim 13 wherein the planar four-bar linkage includes a wheel arm extending from the main axle to the transport wheels.

15. The implement of claim 14 wherein the rotation of the transport wheel rotating assembly from the field use configuration to the transport configuration decreases the distance between the hitch and the transport wheels by 1.5 times the length of the wheel arm.

16. The implement of claim 11 wherein the tongue comprises at least two members configured to move relative to one another to lengthen or shorten the length of the tongue.

17. The implement of claim 16 further comprising first and second cylinders operatively connected between the first and second wings and the tongue and configured to move the wings between a folded configuration and an open configuration.

18. A forward folding implement having a field use configuration and a transport configuration, comprising:
 a telescoping tongue having a first end including a hitch and an opposite second end;
 a main frame at the second end of the tongue and including a main axle and a plurality of transport wheels extending from the main axle;
 first and second wings extending from the main frame and including a plurality of wing wheels extending therefrom; and
 at east one transport wheel rotating assembly positioned at the main axle and comprising a planar four-bar linkage attaching at least one of the transport wheels to the main axle and a cylinder operatively attached to the planar four-bar linkage;
 wherein the at least one transport wheel rotating assembly is configured to rotate the transport wheels about an axis created by the main axle between the field use configuration of the implement wherein the transport wheels are positioned away from the hitch and rearward of the main axle, and the transport configuration wherein the transport wheels are positioned toward the hitch and frontward of the main axle;
 wherein another bar of the planar four-bar linkage is pivotally connected to a wheel arm extending from the main axle to the at least one transport wheel; and
 wherein the rotation of the at least one transport wheel rotating assembly from the field use configuration to the transport configuration decreases a distance between the hitch and the transport wheels by 1.5 times the length of the wheel arm.

* * * * *

UNITED STATES PATENT AND TRADEMARK OFFICE
CERTIFICATE OF CORRECTION

PATENT NO.        : 9,763,376 B2
APPLICATION NO.   : 13/803186
DATED             : September 19, 2017
INVENTOR(S)       : Robert Blackwell It is certified that error appears in the above-identified patent and that said Letters Patent is hereby corrected as shown below:

<u>In Column 10, Claim 18, Line 25:</u>
DELETE "east" before the word one
INSERT --least-- before the word one Signed and Sealed this
Seventh Day of August, 2018

Andrei Iancu
*Director of the United States Patent and Trademark Office*